United States Patent
Bil et al.

(10) Patent No.: US 7,785,066 B2
(45) Date of Patent: Aug. 31, 2010

(54) BLEED SYSTEM FOR A LOW-PRESSURE COMPRESSOR OF A TURBOMACHINE

(75) Inventors: Eric Stephan Bil, Chartrettes (FR); Gilles Alain Charier, La Grande Paroisse (FR); Philippe Jacques Pierre Fessou, Melun (FR); Patrick Charles Georges Morel, Chartrettes (FR)

(73) Assignee: SNECMA, Paris (FR)

( * ) Notice: Subject to any disclaimer, the term of this patent is extended or adjusted under 35 U.S.C. 154(b) by 733 days.

(21) Appl. No.: 11/755,934

(22) Filed: May 31, 2007

(65) Prior Publication Data
US 2008/0063515 A1 Mar. 13, 2008

(30) Foreign Application Priority Data
Jun. 9, 2006 (FR) .................................. 06 52076

(51) Int. Cl.
*F01D 17/00* (2006.01)
(52) U.S. Cl. ..................... 415/145; 415/157; 60/782; 60/785; 60/226.1
(58) Field of Classification Search .................. 415/145, 415/157; 60/785, 782, 226.1
See application file for complete search history.

(56) References Cited

U.S. PATENT DOCUMENTS

| | | | | |
|---|---|---|---|---|
| 4,546,605 A | * | 10/1985 | Mortimer et al. | 60/226.1 |
| 5,351,473 A | * | 10/1994 | Shuba | 60/782 |
| 5,694,767 A | | 12/1997 | Vdoviak et al. | |
| 6,938,407 B2 | * | 9/2005 | Beutin et al. | 60/226.1 |
| 7,624,581 B2 | * | 12/2009 | Moniz | 60/785 |

FOREIGN PATENT DOCUMENTS

| | | |
|---|---|---|
| EP | 0 174 255 | 3/1986 |
| EP | 1 249 618 A1 | 10/2002 |
| EP | 1 308 601 A1 | 5/2003 |
| FR | 2 659 690 | 9/1991 |

* cited by examiner

*Primary Examiner*—Ninh H Nguyen
(74) *Attorney, Agent, or Firm*—Oblon, Spivak, McClelland, Maier & Neustadt, L.L.P.

(57) ABSTRACT

The bypass turbomachine comprises, between a primary flowpath (2) and a secondary flowpath (3), a structural intermediate casing (14). A bleed passage (29) allows the diversion of a portion of the gas stream toward the secondary flowpath (3), downstream of support arms (18) situated at the periphery of the intermediate casing. A bleed opening (28) emerges upstream of the support arms (18). A slide valve (22) slides between three positions, namely a closed position in which the slide valve (22) completely blocks off the bleed passage and opening, an intermediate position in which the bleed opening (28) emerging upstream of the support arms (18) is blocked off, while the bleed passage (29) for diverting a portion of the gas stream downstream of the support arms (18) is open, and an open position in which the bleed opening (28) emerging upstream of the support arms (18) and the bleed passage (29) emerging downstream of the support arms are both open.

5 Claims, 4 Drawing Sheets

BLEED SYSTEM FOR A LOW-PRESSURE COMPRESSOR OF A TURBOMACHINE

BACKGROUND OF THE INVENTION

The invention relates to a bleed system for a low-pressure compressor of a turbomachine.

More specifically, the invention relates to a bypass turbomachine, in particular a bypass jet engine of an aircraft, comprising, between a primary flowpath and a secondary flowpath, a structural intermediate casing arranged axially between a low-pressure compressor and a high-pressure compressor, and a bleed passage for diverting a portion of the gas stream supplied by the low-pressure compressor toward the secondary flowpath, downstream of the support arms, said intermediate casing being equipped at its periphery with a plurality of support arms.

In jet engines, compressor bleed systems perform two functions. Firstly, they adapt the low-pressure compressor by expelling excess air to prevent surge or rotating stall. Secondly, their function is to expel hail, since engine flame-out could occur if hail were to reach as far as the chamber.

DESCRIPTION OF THE PRIOR ART

In the currently known devices (EP 1 308 601), air is bled off via a slide valve mechanism situated in front of the intermediate casing and then discharged into the secondary stream behind the secondary-stream guide vanes. However, to improve engine performance, it is known practice to integrate the secondary-stream guide vanes into the support arms of the jet engine. This results in air being expelled behind the support arms, a situation which is difficult to achieve, particularly in the case of small engines, since there is little inter-flowpath height available. These devices therefore do not allow satisfactory expulsion of hail.

SUMMARY OF THE INVENTION

The present invention aims to provide a turbomachine and a bleed system which overcome these disadvantages.

These aims are achieved according to the invention by virtue of the fact that the turbomachine or the bleed system comprises a bleed opening emerging upstream of the support arms and a slide valve occupying three positions, namely a closed position in which the slide valve completely blocks off the bleed passage and opening, an intermediate position in which the bleed opening emerging upstream of the support arms is blocked off, while the bleed passage for diverting a portion of the gas stream downstream of the support arms is open, and an open position in which the bleed opening emerging upstream of the support arms and the bleed passage emerging downstream of the support arms are both open.

Owing to this feature, hail can be completely expelled when the slide valve is in the open position. The risks of engine flame-out are thus eliminated in the event of hail.

Advantageously, the slide valve comprises a flange which blocks off the bleed opening when the slide valve is in the intermediate position.

In a particular embodiment, the turbomachine comprises a case ring on which the slide valve slides.

Preferably, the slide valve is equipped with elastomeric seals or with brush seals in order to provide sealing between the slide valve and the plate. Furthermore, the invention relates to a bleed system for a low-pressure compressor forming part of a turbomachine according to the invention.

BRIEF DESCRIPTION OF THE DRAWINGS

Other features and advantages of the invention will become apparent on reading the description below of an exemplary embodiment given by way of illustration with reference to the appended figures. In these figures.

DESCRIPTION OF THE PREFERRED EMBODIMENTS

Figure 1:
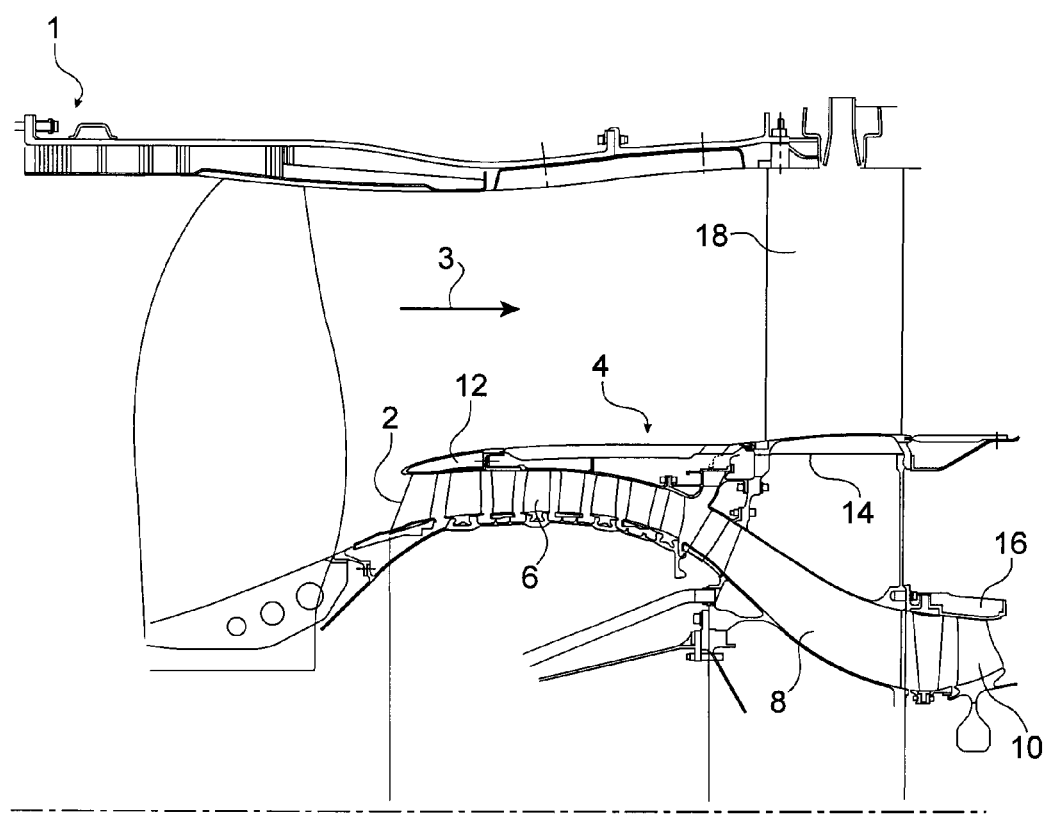
FIG. 1 is a partial view of a jet engine comprising a bleed system according to the present invention.

In FIG. 1, a bypass jet engine of axis X-X comprises, in its front region, a fan 4 which delivers air to an annular primary flowpath 2 and to an annular secondary flowpath 3 which are separated by an inter-flowpath casing 4.

Installed in succession in the primary flowpath 2, from upstream to downstream, are a low-pressure compressor 6, an annular duct 8 having a swan-neck cross-sectional shape, and a high-pressure compressor 10 which supplies compressed air to a combustion chamber (not shown).

The inter-flowpath casing 4 comprises, from upstream to downstream, a stream-dividing spoiler (12) whose internal wall constitutes the stator of the low-pressure compressor, a structural intermediate casing 14 which, in its radially internal region, comprises the duct 8 in the shape of a swan-neck, and the stator 16 of the high-pressure compressor 10. The secondary flowpath 3 is delimited internally by the external wall of the spoiler 12 and by the internal platforms of engine support arms 18 which pass through the secondary flowpath. In this embodiment, the outlet guide vanes (OGV) are integrated into the support arms 18.

Figure 2:
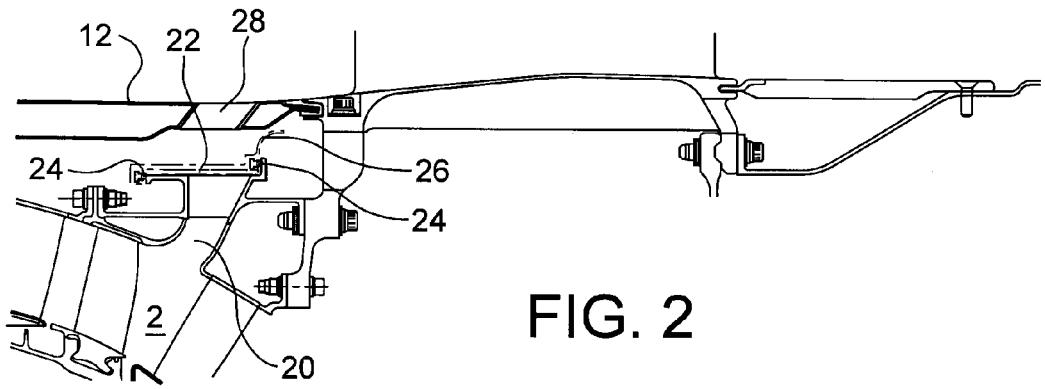
FIG. 2 is a view of the bleed system in the closed position.

As can be seen from FIG. 2, an annular manifold 20 opens into the primary flowpath downstream of the low-pressure compressor 6. This manifold can be closed by a slide valve 22 which is mounted to slide between three positions. In its position represented in FIG. 2, the slide valve is in its completely closed position, in which it blocks off the annular manifold 20 in a sealed manner. For this purpose, seals 24 provide a sealed connection between the slide valve 22 and the annular manifold 20.

Figure 3:
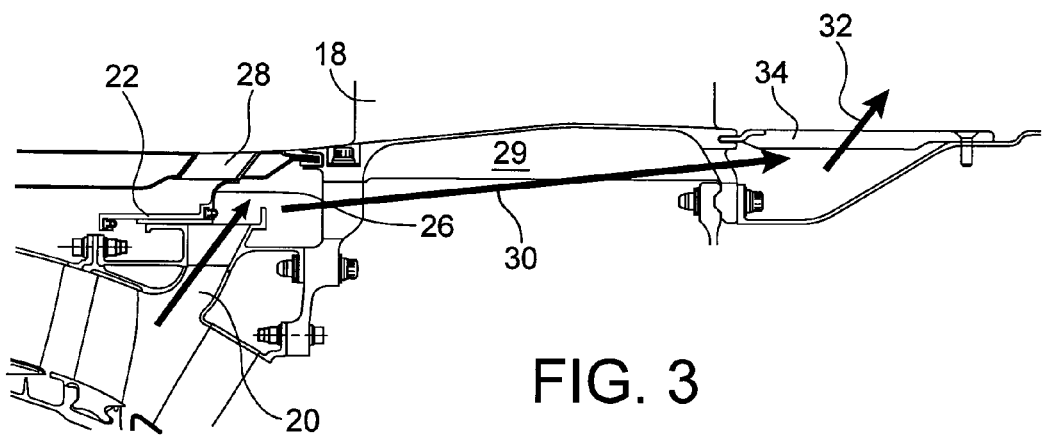
FIG. 3 is a view of the bleed system in the intermediate position.

In FIG. 3, the slide valve has been shown in the intermediate position. In this position, a flange 26, which is fixedly attached to the slide valve 22, isolates the bleed opening 28 which emerges upstream of the support arms 18. The bleed passage 29 for diverting a portion of the gas stream downstream of the support arms 18 are, by contrast, open, as depicted by the arrows 30 and 32. The air stream passes beneath the support arms 18 and escapes downstream of these arms through the grilles 34. It then mixes with the secondary stream 3.

Figure 4:
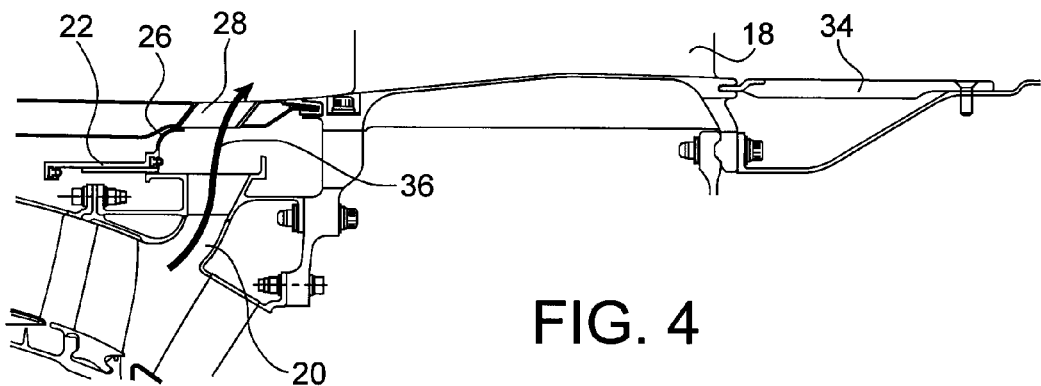
FIG. 4 is a view of the bleed system in the completely open position.

FIG. 4 shows the operation with the slide valve in the completely open state. In this position, the flange 26 of the slide valve 22 completely exposes the bleed opening 28 emerging upstream of the support arms 18. This position is adopted in the event of hail, particularly during low engine speeds. Hail can be expelled directly into the secondary stream, as depicted by the arrow 36. It is thus possible to prevent any clogging of the inter-flowpath portion of the intermediate casing. Losses in aerodynamics are acceptable since hail does not need to be expelled at high engine speeds.

Figure 5:
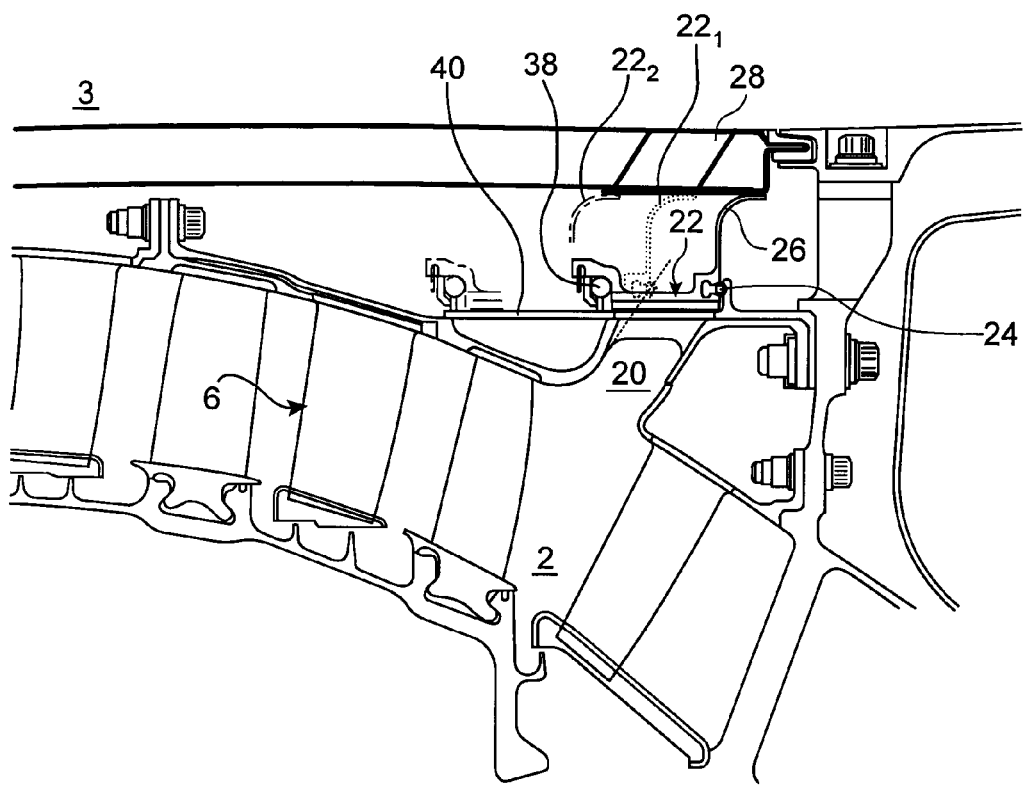
FIG. 5 is a representation of a variant embodiment comprising a brush seal.

FIG. 5 shows a variant embodiment in which one of the seals 38 is a brush seal while the other seal 24 is an elastomeric seal. In this variant embodiment, the slide valve 22 slides on a case ring 40. In FIG. 5, the slide valve has been shown in the completely closed position, the intermediate and completely open positions being depicted by the reference numbers $22_1$ and $22_2$.

Figure 6:
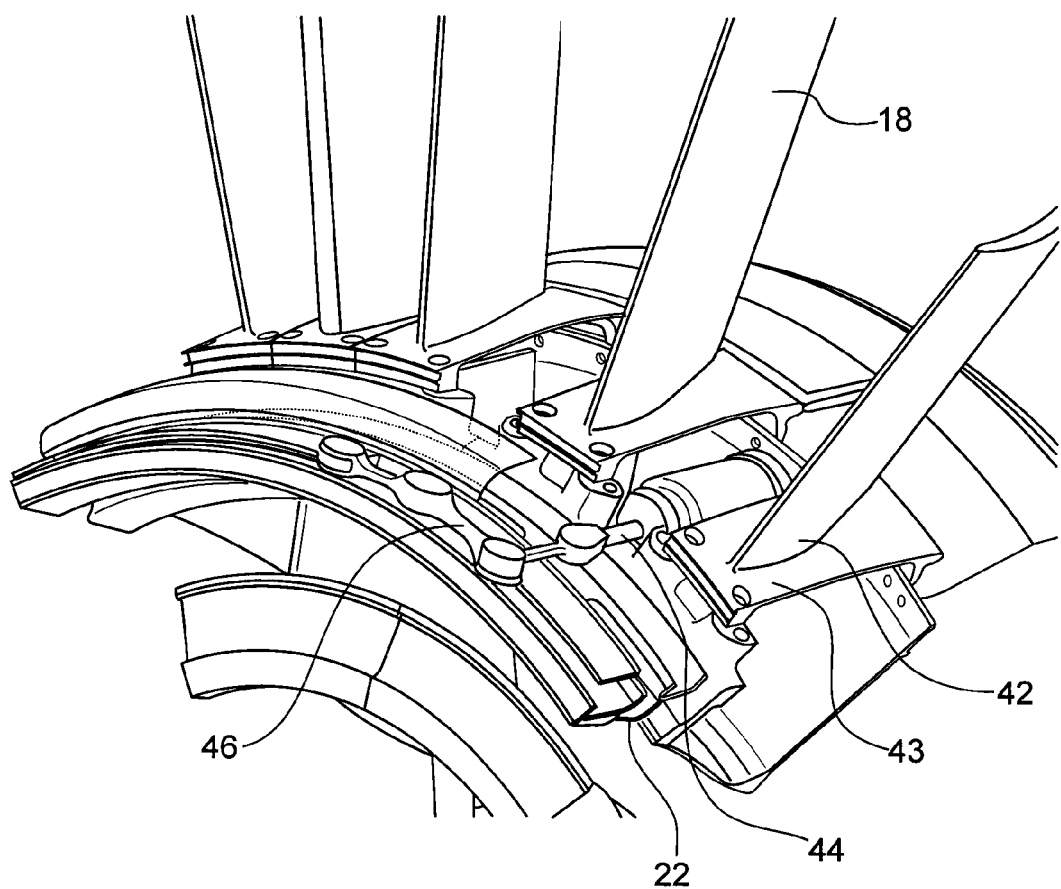
FIG. 6 is a perspective view which shows an example of means for actuating the slide valve.

FIG. 6 shows an illustrative example of the means by which the slide valve 22 can be actuated and switched from one position to another. In the example, these means are formed by a ram 42, for example a hydraulic or electric ram. The ram 42 is situated beneath the platforms 43 of the outlet guide vanes 18 (OGV).

The rod 44 of the ram actuates a bellcrank 46 which reverses the movement of the ram. When the rod 44 is extended, the slide valve 22 is in the closed position, and, conversely, when the rod of the actuator is retracted, the slide valve is in the open position, as represented in FIG. 6.

The invention claimed is:

1. A bypass turbomachine, in particular a bypass jet engine of an aircraft, comprising, between a primary flowpath and a secondary flowpath, a structural intermediate casing arranged axially between a low-pressure compressor and a high-pressure compressor, and a bleed passage for diverting a portion of the gas stream supplied by the low-pressure compressor toward the secondary flowpath, downstream of support arms situated at the periphery of the intermediate casing, wherein the turbomachine comprises a bleed opening emerging upstream of the support arms and a slide valve occupying three positions, namely a closed position in which the slide valve completely blocks off the bleed passage and opening, an intermediate position in which the bleed opening emerging upstream of the support arms is blocked off, while the bleed passage for diverting a portion of the gas stream downstream of the support arms is open, and an open position in which the bleed opening emerging upstream of the support arms and the bleed passage emerging downstream of the support arms are both open.

2. The turbomachine as claimed in claim 1, wherein the slide valve comprises a flange which blocks off the bleed opening when the slide valve is in the intermediate position.

3. The turbomachine as claimed in claim 1, which comprises a case ring on which the slide valve slides.

4. The turbomachine as claimed in claim 1, wherein the slide valve is equipped with elastomeric seals or with brush seals in order to provide sealing between the slide valve and the primary flowpath.

5. A bleed system for a low-pressure compressor forming part of a turbomachine as claimed in claim 1.

* * * * *